United States Patent [19]

Matsushima

[11] Patent Number: 5,670,754
[45] Date of Patent: Sep. 23, 1997

[54] DIGITIZER AND POSITION DETERMINATION METHOD THEREFOR

[75] Inventor: Keiichi Matsushima, Kanagawa, Japan

[73] Assignee: Graphtec Corp., Japan

[21] Appl. No.: 411,110

[22] Filed: Mar. 27, 1995

[30] Foreign Application Priority Data

| Mar. 31, 1994 | [JP] | Japan | 6-087871 |
| Aug. 15, 1994 | [JP] | Japan | 6-191490 |
| Jan. 20, 1995 | [JP] | Japan | 6-007277 |

[51] Int. Cl.[6] .................................. G09C 21/00
[52] U.S. Cl. ................................. 178/18; 178/19
[58] Field of Search ....................... 178/18, 19, 20; 345/156, 158, 174, 177, 179

[56] References Cited

U.S. PATENT DOCUMENTS

| 4,260,852 | 4/1981 | Fencl | 178/19 |
| 4,477,877 | 10/1984 | Nakamura et al. | |
| 4,507,523 | 3/1985 | Gohara | 178/19 |
| 4,616,107 | 10/1986 | Abe et al. | |
| 4,717,793 | 1/1988 | Kobayashi | 178/18 |
| 4,848,496 | 7/1989 | Murakami | 178/19 |
| 4,878,553 | 11/1989 | Yamanami | 178/18 |
| 5,120,907 | 6/1992 | Shinbori | 178/18 |
| 5,134,253 | 7/1992 | Doubrava | 178/18 |
| 5,369,227 | 11/1994 | Stone | 178/19 |

FOREIGN PATENT DOCUMENTS

| 0110131 | 10/1983 | European Pat. Off. | G06K 11/06 |
| 3-241415 | 10/1991 | Japan . | |
| 6-149449 | 5/1994 | Japan . | |
| 2 140 562 | 4/1983 | United Kingdom | G08C 21/00 |

*Primary Examiner*—Curtis Kuntz
*Assistant Examiner*—Vijay Shankar
*Attorney, Agent, or Firm*—Blakely Sokoloff Taylor & Zafman

[57] ABSTRACT

A digitizer and a method for calculating the position coordinates indicated by a position indicator on a tablet. The position indicator has a coil that electromagnetically interacts with the loop coil group of the tablet. A signal detection unit, a "sum" signal specifying unit, and a coordinate determination unit are utilized. The signal detection unit sequentially selects two loop coils as a loop coil pair from the loop coil group of the tablet and acquires a "sum" of and a "difference" between signals generated in respective coils of each loop coil pair. The "sum" signal specifying unit specifies one of the loop coil pairs of the loop coil group which generates a "sum" signal of a maximum absolute value when the coil of the position indicator and the loop coil group of the tablet are brought into an interaction state. The coordinate determination unit determines position coordinates on the tablet designated by the position indicator, on the basis of a "difference" signal of the specified loop coil pair.

9 Claims, 14 Drawing Sheets

FIG. 1 CONTROL MEANS 15

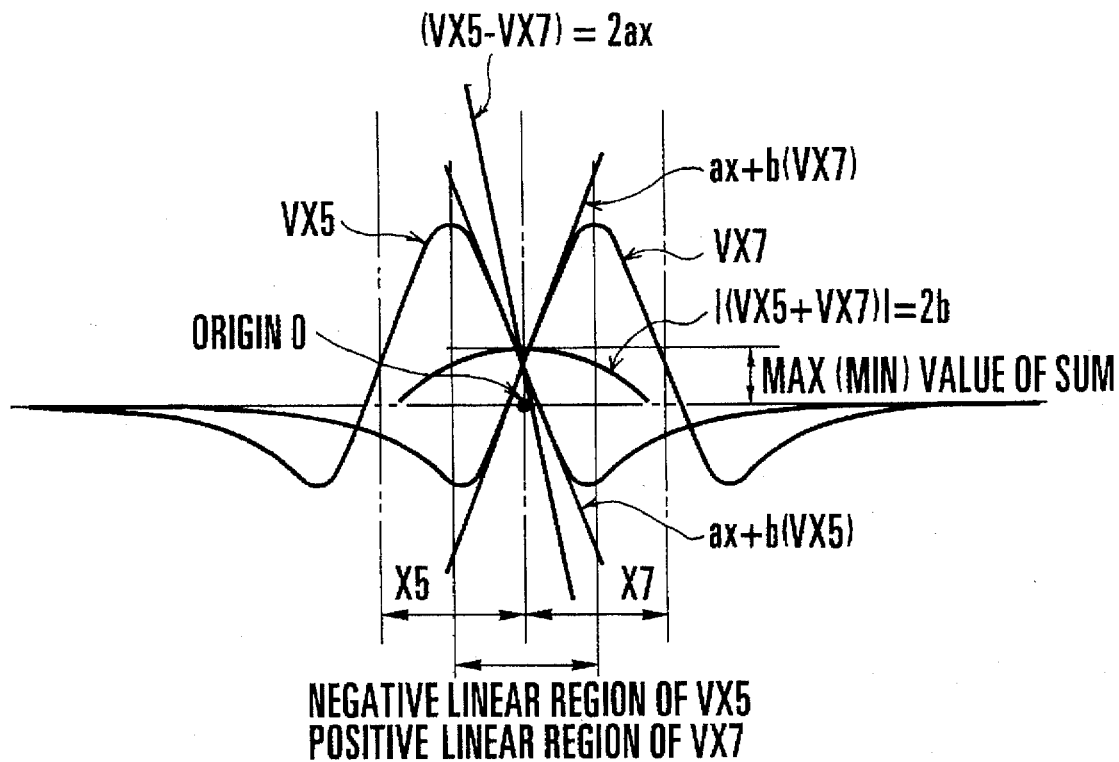
F I G. 3
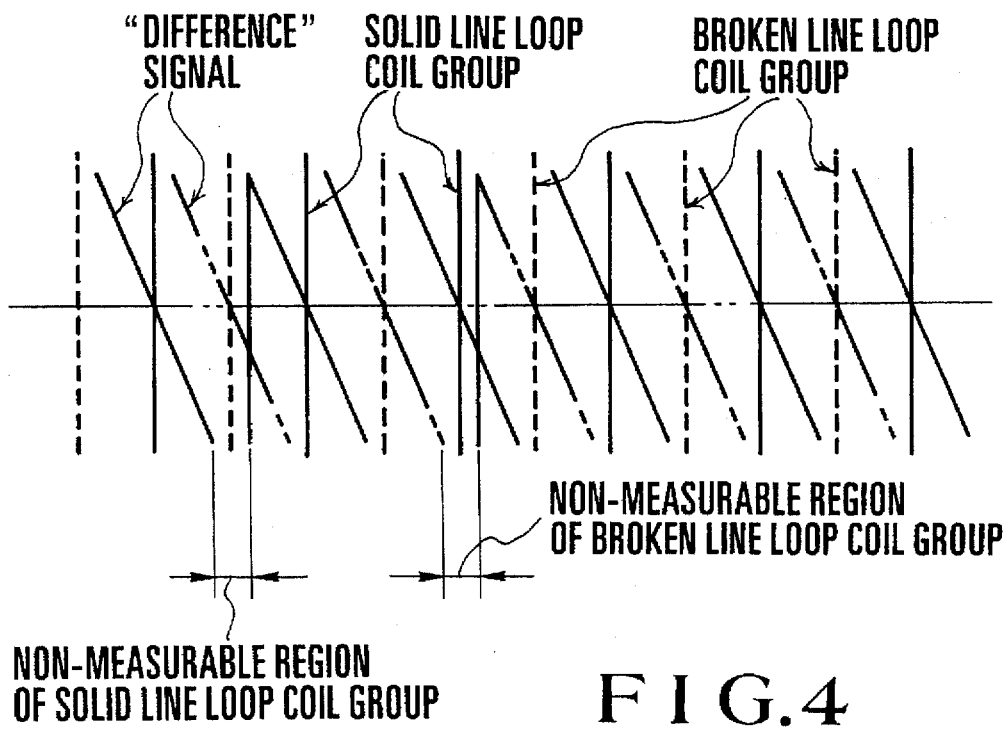
F I G. 4

DIGITIZER AND POSITION DETERMINATION METHOD THEREFOR

BACKGROUND OF THE INVENTION

The present invention relates to a digitizer for calculating position coordinates indicated by a position indicator on a tablet on the basis of an output signal based on interaction between the position indicator and a large number of loop coils arranged on the tablet in association with positions, and a position determination method for the digitizer.

For example, a conventional digitizer of this type is disclosed in Japanese Patent Application No. 4-328472 (Japanese Patent Laid-Open No. 6-149449).

The arrangement of this digitizer will be described below with reference to FIG. 15.

On a tablet 1 of this digitizer, for example, X-direction loop coils (x1, x2, x3, . . . ) are sequentially arranged in the X direction, and Y-direction loop coils (y1, y2, y3, . . .) are sequentially arranged in the Y direction.

The X-direction loop coils are selectively connected to the input terminal of a voltage amplifier 13 via an X-axis scanner 11. The Y-direction loop coils are selectively connected to the input terminal of a voltage amplifier 16 via a Y-axis scanner 12. Note that the output terminal of the voltage amplifier 13 is connected to the input terminal of a current amplifier 14 and capable of forming a so-called closed loop together with a surrounding coil 101 arranged on the tablet 1.

Assume that a position indicator 2 is positioned on the tablet 1. When an X-axis loop coil located near a coil L of the position indicator 2 is connected to the input terminal of the voltage amplifier 13 via the X-axis scanner 11, the X-axis loop coil forms a closed loop together with the surrounding coil 101, on the tablet 1, which is connected to the output terminal of the current amplifier 14. The coil L of the position indicator 2, the amplifiers 14 and 13, and the X-axis loop coil connected to the amplifiers 14 and 13, and the surrounding coil 101 constitute a connection system. In response to ambient noise or noise caused by the circuit itself as a trigger, oscillation occurs at the natural frequency of the connection system. At this time, output from the voltage amplifier 13 is input to a utilization circuit 40.

Meanwhile, the Y-axis scanner 12 measures induced signals generated in the respective Y-axis loop coils while sequentially switching the loop coils, and outputs the signals to the utilization circuit 40 via the voltage amplifier 16. With this operation, a Y-axis output signal distribution can be obtained.

Subsequently, the X-axis scanner 11 is operated to sequentially form oscillation systems, each of which is equivalent to the one described above, while sequentially switching the X-axis loop coils, and outputs from the voltage amplifier 13 are sequentially measured and stored in the utilization circuit 40 for each of the oscillation systems. With this operation, an X-axis output signal distribution can be obtained.

The utilization circuit 40 calculates and determines the X- and Y-axis positions indicated by the position indicator 2 from the output distribution results on the two axis sides.

The above apparatus obtains the coordinate values indicated by the position indicator on the basis of the ordinal numbers of the loop coils in each direction and corresponding voltage level distributions. This is based on the assumption that the ordinal number of the loop coils in each direction and corresponding voltage level distributions can be approximated to a quadratic function, as shown in FIG. 16.

Consider the relationship between a loop coil (e.g., a loop coil x1) and the coil L of the position indicator 2. The maximum or minimum output signal level appears when the coil L is located near the center of the loop coil x1, whereas the output signal level gradually decreases or increases as the coil L approaches an end portion of the loop coil x1.

As described above, the conventional digitizer calculates position coordinates on the respective axes considering output signal level characteristics (output distribution characteristics) as a quadratic function. Therefore, when output signals can be approximated to a quadratic function, the digitizer can be simplified in arrangement. If, however, the distributed state of the above voltage levels greatly deviates from a quadratic function, the position coordinates indicated by the position indicator cannot be accurately calculated. In addition, a large number of calculation steps are required to obtain position coordinates, resulting in a long processing time.

SUMMARY OF THE INVENTION

It is, therefore, an object of the present invention to ensure a predetermined position detection precision even if output signals greatly deviate from a quadratic function.

It is another object of the present invention to shorten the time required for a calculation process.

In order to achieve the above objects, according to the present invention, there is provided a digitizer including a tablet on which a plurality of loop Coils are arranged in association with positions, and a position indicator having at least a coil which electromagnetically interacts with each loop coil on the tablet to generate a predetermined signal in each loop coil, comprising signal detection means for selecting two adjacent loop coils as a loop coil pair from a loop coil group arranged on the tablet and acquiring a "sum" of and a "difference" between signals generated by interaction between the selected loop coil pair and the position indicator, and position determination means for determining a position, on the tablet, which is indicated by the position indicator on the basis of the "sum" of and the "difference" between the acquired signals by the signal detection means.

BRIEF DESCRIPTION OF THE DRAWINGS

FIG. 3 is a graph showing how the coordinates indicated by a position indicator are detected by the apparatus of the first embodiment;

FIG. 4 is a graph showing the relationship between the arrangement of loop coils of the apparatus of the first embodiment and difference signals based on signals generated in the respective loop coils;

DESCRIPTION OF THE PREFERRED EMBODIMENTS

Embodiments of the present invention will be described below with reference to the accompanying drawings.

Figure 1:
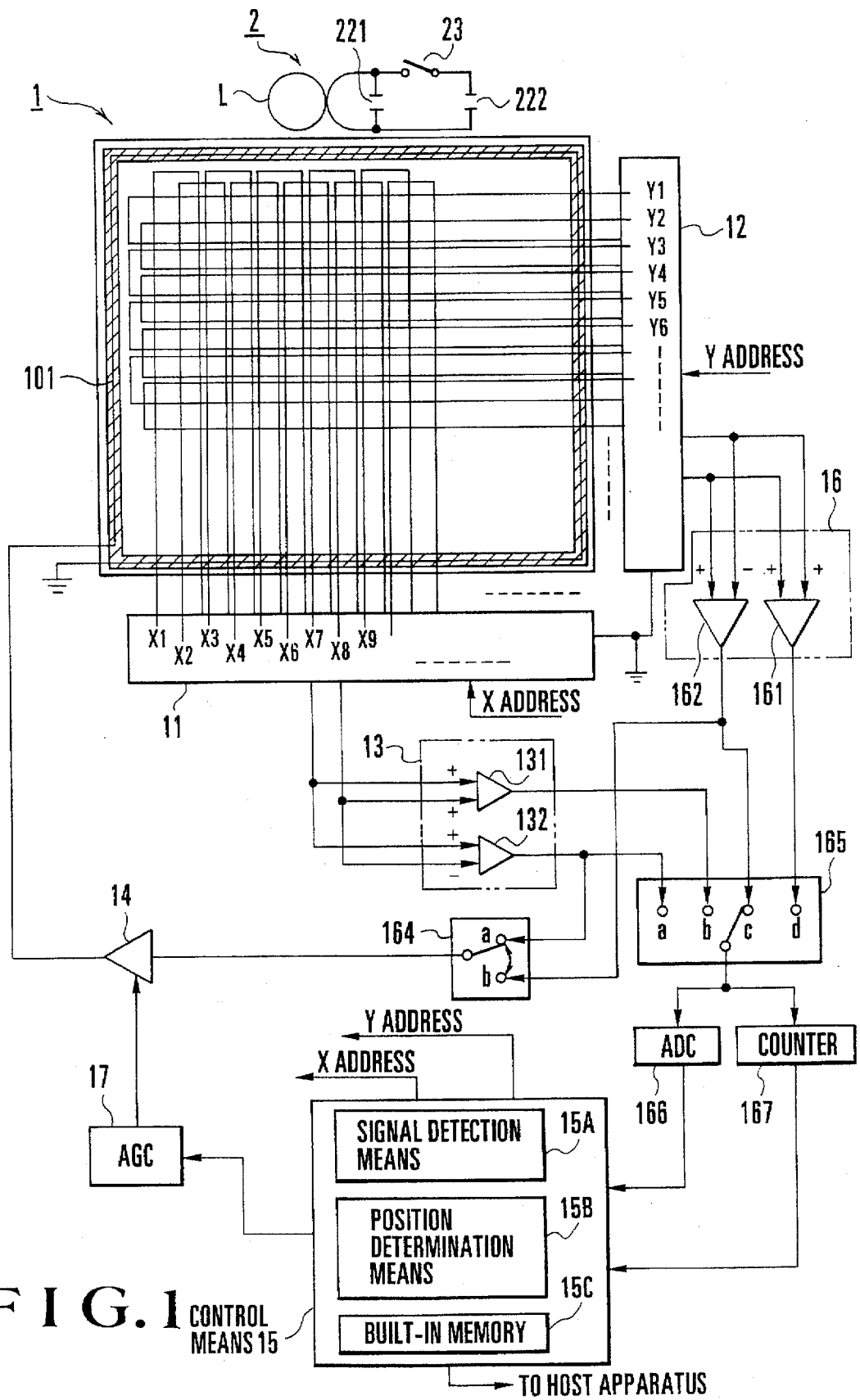
FIG. 1 is a block diagram showing the first embodiment of the present invention.

FIG. 1 shows a digitizer according to the first embodiment of the present invention. Referring to FIG. 1, a position determination element group is arranged on a tablet 1. The position determination element group is constituted by a plurality of X-axis loop coils (x1, x2, x3, . . . ) sequentially arranged on the X-axis, and a plurality of Y-axis loop coils (y1, y2, y3, . . . ) sequentially arranged on the Y-axis. As indicated by the solid lines in FIG. 2, loop coils x1, x3, x5,... of an X-axis loop coil group (to be referred to as a solid line loop coil group hereinafter) are arranged in such a manner that the right long-side conductor of the loop coil x1 and the left long-side conductor of the loop coil x3, the right long-side conductor of the loop coil x3 and the left long-side conductor of the loop coil x5, the right long-side conductor of the loop coil x5 and the left long-side conductor of the loop coil x7, . . . are insulated from each other and arranged to be in contact with each other, adjacent to each other, or stacked on each other.

Similarly, as indicated by the broken lines in FIG. 2, loop coils x2, x4, x6, . . . of an X-axis loop coil group (to be referred to as a broken line loop coil group hereinafter) are arranged in such a manner that the right long-side conductor of the loop coil x2 and the left long-side conductor of the loop coil x4, the right long-side conductor of the loop coil x4 and the left long-side conductor of the loop coil x6, the right long-side conductor of the loop coil x6 and the left long-side conductor of the loop coil x8, . . . are insulated from each other and arranged to be in contact with each other, adjacent to each other, or stacked on each other. The solid line loop coil group and the broken line loop coil group are shifted from each other by half a pitch. Note that the respective Y-axis loop coil groups are arranged in the same manner as described above.

The position determination element groups in the respective directions are connected to X- and Y-axis scanners 11 and 12, respectively, as shown in FIG. 1. These elements are selected by address control signals from a control means 15 and are selectively connected to amplifier groups 13 and, 16 on the respective axis sides, which are respectively constituted by addition amplifiers 131 and 161 and subtraction amplifiers 132 and 162. Note that output signals from the X- and Y-axis amplifier groups 13 and 16 are data, each containing position information in a corresponding direction, which are transmitted to the control means 15, as will be describe later. In this case, in the apparatus of this embodiment, output signals from the subtraction amplifier 132 of the X-axis amplifier 13 and the subtraction amplifier 162 of the Y-axis amplifier 16 can be selectively connected to the input terminal of a current amplifier 14.

In the apparatus of this embodiment, a surrounding coil 101 is also arranged to surround the position determination element group on the tablet 1. The surrounding Coil 101 is connected to the output terminal of the current amplifier 14.

The addition amplifiers 131 and 161 of the X- and Y-axis amplifier groups 13 and 16 perform addition of signals generated in two selected position determination elements. The subtraction amplifiers 132 and 162 perform subtraction of signals generated in two selected position determination elements. The current amplifier 14 serves as a saturation amplifier for generating the maximum output even if an input signal is very small.

A first switch 164 switches outputs from the subtraction amplifiers 132 and 162 to output the selected output to the current amplifier 14. A second switch 165 switches outputs from the respective amplifiers to output the selected output to an ADC (A/D converter) 166 and a frequency counter 167. In this case, the ADC 166 obtains the digital value of an input signal and outputs it to the control means 15. The frequency counter 167 obtains the frequency of an input signal and outputs it t9 the control means 15.

The control means 15 controls the X- and Y-axis scanners 11 and 12 to switch connection of the respective loop coils, and obtains each of the above signals from the ADC 166 and the frequency counter 167, thereby detecting the position coordinates indicated by the position indicator 2 and its operated state.

The position indicator 2 comprises a coil L as a position indication element (to be referred to as a position indication element L hereinafter), first and second capacitors 221 and 222, and a switch 23. When the user turns on/off the switch 23, a plurality of different LC circuits (loads corresponding to the position indication element L) are selectively formed.

Assume that the position indicator 2 (position indication element L) is positioned on tablet 1. In this case, when adjacent loop coils on one axis side, e.g., a pair of adjacent X-axis loop coils (position determination elements), are connected to the input terminals of the subtraction amplifier 132 of the X-axis amplifier group 13 via the X-axis scanner 11 in accordance with an address signal from the control means 15, a connection system is constituted by the pair of adjacent position determination elements, the subtraction amplifier 132 of the X-axis amplifier group 13, the current amplifier 14, the surrounding coil 101, the position indication element L, and the pair of adjacent position determination elements.

When oscillation conditions are satisfied, such a connection loop is oscillated at its natural frequency in response to noise caused by the circuit itself as a trigger. As described above, since the current amplifier 14 is a saturation amplifier, even if an output from the X-axis subtraction amplifier 132 is small, the output is amplified to the maximum output value. Therefore, an oscillated state which is quickly stabilized can be obtained.

In the apparatus of this embodiment, such an oscillated state serves to generate a stable magnetic field from the position indication element L of the position indicator 2. Under the stable magnetic field from the position indication element L in this oscillated state, signals generated in the position determination element group on the other axis side are used. Each signal generated in the position determination element group on the other axis side contains information associated with the distance from a corresponding position determination element to the position indication element. In this case, such an output will be referred to as a position-associated signal.

In accordance with a command from the control means 15, a position determination element on one axis side is fixed as an oscillation system, and the position determination elements on the other axis side are sequentially switched by using the scanner on the other axis side, thereby sequentially obtaining different position-associated signals. With this operation, the position coordinates indicated by the position indicator 2 on the tablet 1 can be obtained.

A position coordinate determining operation of the apparatus of this embodiment will be described in detail next.

Since detailed X- and Y-axis position detecting operations for the position indicated by the position indicator 2 (position indication element L) on the tablet 1 include similar operations, an X-axis direction position detecting operation will be mainly described below. A detailed Y-axis direction position detecting operation will be described, as needed.

Figure 2:
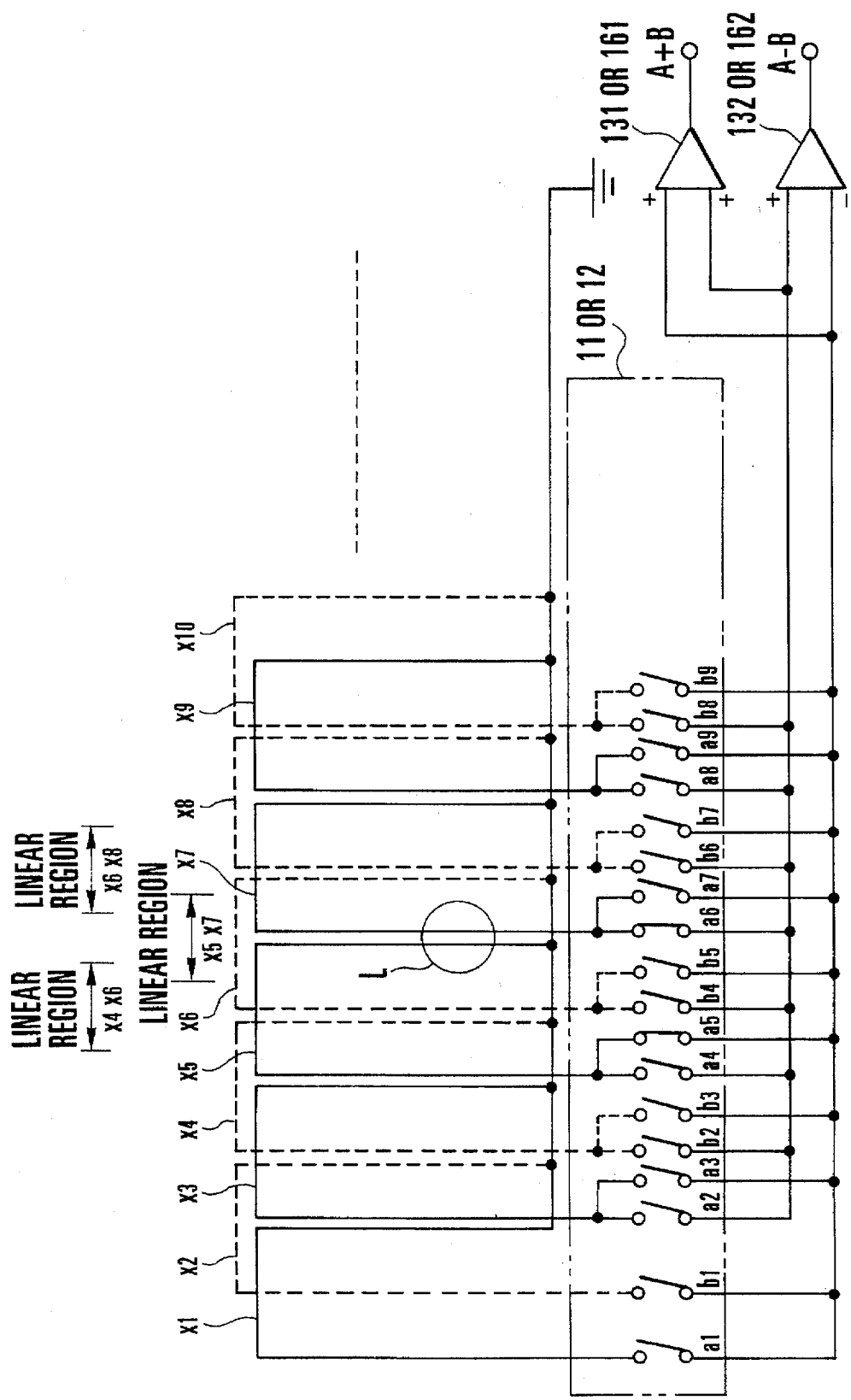
FIG. 2 is a circuit diagram showing the arrangement of the main part of the apparatus of the first embodiment.

Consider the two loop coils x5 and x7 (or the Y-axis loop coils y5 and y7) in FIG. 2. These loop coils x5 and x7 are in contact with each other in an insulated state (the opposing long sides of these loop coils are actually stacked on each other). Letting VX5 and VX7 be the output voltages generated when the position indication element L of the position indicator 2 cross the loop coils x5 and x7 while a stable magnetic field is generated by the position indication element L of the position indicator 2, these signals VX5 and VX7 change in the manner shown in FIG. 3. Output level curves based on interaction between the loop coils x5 and x7 and the position indication element L of the position indicator 2 exhibit the maximum (or minimum) output levels when the position indication element L is located near the centers of the respective loop coils. These output levels gradually decrease (or increase) as the position indication element L shifts from the centers of the respective loop coils. This decrease (or increase) region can be considered as an almost linear change region.

If the overlapping portion between the loop coils x5 and x7 is regarded as a reference position on the X-axis (generally, the direction in which loop coils are arranged), and the negative linear region of the signal VX5 shown in FIG. 3 is represented by (−ax+b), the positive linear region of the signal VX7 is represented by (ax+b). This is because the loop coils x5 and x7 are made of the same material to have the same shape and are different only in the positions where they are arranged.

The absolute value of the "sum" of the two signals VX5 and VX7 becomes a constant value 2b. The "difference" between these signals is represented by a straight line having a slope 2ax. With regard to the two loop coils x5 and x shown in FIG. 2, when the position indication element L is present within these linear regions, the absolute value of the "sum" of the two signals is a constant value, and the "difference" between the two signals is represented as a linear function of a position X (or Y) in the linear regions. Therefore, as shown in FIG. 4, when such linear regions are sequentially arranged in the position determining direction, coordinates can be read in a wide range.

In this case, therefore, when the position indication element L is located outside the linear region, the absolute value of the "sum" of the two signals exhibits a value smaller (or larger) than the above value. That is, the absolute value of this "sum" exhibits the maximum (or minimum) value within the linear region.

In the apparatus of this embodiment, the above position determination principle is used. Therefore, the coordinate values indicated by the position indication element L can be obtained by obtaining the "sum" of and the "difference" between signals generated in loop coils (position determination elements) whose opposing long-side conductors are located close to each other.

The detailed operation of the apparatus of this embodiment having the above arrangement will be described below.

As described above, the position determination elements of the apparatus of this embodiment can be classified into two groups, i.e., the loop coil group indicated by the solid lines, including the loop coils x1, x3, x5, . . . and the loop coil group indicated by the broken lines, including the loop coils x2, x4, x6, . . . . In this apparatus, the coordinates indicated by the position indication element L of the position indicator 2 are almost determined according to five procedures, and these procedures are used cyclically and continuously.

Procedure (1): Step of Acquiring Output Signals from Y-axis Oscillation Systems

A signal detection means 15A in the control means 15 outputs a mode designation command and a scanner designation command to the tablet 1. In response to this mode designation command, each portion of the tablet 1 is set in a state suitable for the execution of the step of acquiring an output signal from a Y-axis oscillation system. In response to the subsequent scanner designation command, selective connection states of the scanners 11 and 12 of the respective axes are designated. More specifically, a program associated with this operation mode is read out from a built-in ROM, and each portion of the tablet 1 is set in a predetermined state in accordance with the mode designation command. In accordance with the subsequent scanner designation command,. X and Y address signals for switching the connection of each scanner are output to each of the scanners 11 and 12. In this operation mode, different oscillation systems are sequentially formed by sequentially switching the Y-axis loop coils, and output signals from the formed oscillation systems are acquired. In this case, therefore, the scanner designation command is an ordinal number signal for selecting a Y-axis loop coil. In this state, a connection switching command is supplied to only the Y-axis scanner 12.

With the above operation, a connection system is constituted by a selected Y-axis loop coil, the subtraction amplifier 162 of the Y-axis voltage amplifier group 16, the current amplifier 14, the surrounding coil 101, and the selected Y-axis loop coil. If the position indication element L of the position indicator 2 is present near the selected Y-axis loop coil, the connection system forms an oscillation system in response to ambient electric noise wave as a trigger, and the oscillation system starts to oscillates at an intensity corresponding to the distance from the selected Y-axis loop coil to the position indication element L.

The signal detection means 15A receives measurement data at a stage in which the oscillation is stabilized (a stage in which the oscillation voltage becomes a constant value). That is, the signal detection means 15A performs control to set the second switch 165 (FIG. 1) to a terminal c (at this time, the first switch 164 is connected to a terminal b). The second switch 165 is connected to the output terminal of the subtraction amplifier 162 of the Y-axis voltage amplifier group 16 so as to output the oscillation output from the oscillation system to the ADC 166 and the frequency counter 167. The ADC 166 converts the magnitude (level) of the oscillation output into a digital value. This value is a function of the distance from the selected Y-axis loop coil to the position indication element L.

The frequency counter 167 obtains the frequency of an input signal on the basis of the repetition count (period) of the signal per unit time. The operated state of the position indicator 2 can be changed by changing the load of the position indication element L using the switch 23 or the like. A change in the position indication element L leads to a change in the frequency of an oscillation output from the above oscillation system. Therefore, an output from the frequency counter 167 represents the operated state of the position indicator 2 itself.

The AD data (the output from the ADC 166) of these data received by the signal detection means 15A and the above scanner command signal, i.e., the ordinal number data of the selected Y-axis loop coil, are stored, as a pair of data, in a built-in memory 15c. In addition, the frequency data (the output from the frequency counter 167) is stored in the built-in memory 15c in such a manner that the data can be sequentially updated by frequency data sequentially input upon subsequent measuring operations. Such frequency data is converted into an operation state signal associated with the position indicator 2, as needed.

With the above operation, acquisition of an output signal from one Y-axis oscillation system is completed. Subsequently, the signal detection means 15A outputs the scanner designation command in which the information indicating the ordinal number of a Y-axis loop coil to be selected is changed. In response to this command, acquisition of an oscillation output from the next Y-axis oscillation system is started.

That is, in this operation mode, output signals from the respective oscillation systems based on selected Y-axis position determination elements (e.g., an oscillation system of the loop coil y1, an oscillation system of the loop coil y2, an oscillation system of the loop coil y3, . . . ) are sequentially input to the signal detection means 15A. The signal detection means 15A sequentially stores these output signals in the built-in memory 15c.

Procedure (2): Step of specifying Stable Y-axis Oscillation System

A position determination means 15B in the control means 15 compares the magnitudes of the output signals from the respective Y-axis oscillation systems, which are obtained in the above operation mode. The ordinal number of a Y-axis oscillation system, i.e., a Y-axis loop coil, which exhibits the maximum value (stable oscillating operation) is specified.

Procedure (3): Step of Acquiring Induced Signals from X-axis Position Determination Element Pairs When the ordinal number of the oscillation system exhibiting the maximum oscillation output, e.g., the ordinal number of the corresponding Y-axis loop coil, is specified, the step of acquiring induced signals from X-axis position determination element pairs is started.

The signal detection means 15A outputs a mode designation command to set each portion of the tablet 1 in this operation mode. In this case, a scanner designation command outputted from the signal detection means 15A serves to fix, a Y-axis loop coil to the ordinal number specified above. With regard to the X-axis loop coils, the scanner designation signal serves to sequentially select loop coil pairs of each group, as shown in FIG. 2, while sequentially changing the designated ordinal number. Upon oscillation of the Y-axis oscillation system exhibiting the maximum oscillation output, a stable magnetic field is generated by the position indication element L of the position indicator 2. Therefore, a stable effect will act on a selected X-axis loop coil pair. Note that in this case as well, the first switch 164 is still connected to a terminal b.

The signal detection means 15A outputs an X address signal to the X-axis scanner 11 in accordance with the scanner designation command to select an X-axis loop coil pair having the designated ordinal number. Subsequently, the second switch 165 is connected to the terminal b to supply an, output signal from the addition amplifier 131 of the X-axis voltage amplifier 13, i.e., a "sum" signal of induced signals from the selected X-axis loop coil pair, to the ADC 166 and the frequency counter 167.

Operations to be performed by the ADC 166, the frequency counter 167, and the subsequent components are the same as those in the step of acquiring output signals from a plurality of oscillation systems. The ordinal numbers of selected X-axis loop coil pairs and the "sum" data of induced signals are sequentially stored in pair in the built-in memory 15c in the control means 15. In addition, frequency data obtained by the frequency counter 167 are sequentially updated.

Procedure (4): X-axis Position Determination Step

The position determination means 15B performs the X-axis position determination step following the above step of acquiring induced signals from X-axis position determination element pairs.

That is, the position determination means 15B performs the following calculations with respect to the "sum" data acquired from a plurality of X-axis loop coil pairs and stored in the above step:

①The absolute values of the "sum" data obtained by the respective pairs of adjacent X-axis loop coils are sequentially calculated, and the ordinal number of a loop coil pair exhibiting the maximum calculation result is specified.

More specifically, the ordinal number of a loop coil pair from which the maximum calculation result can be obtained is specified by sequentially calculating, for example, the following absolute values of the respective "sum" data: the absolute value of the sum of output data from the pair of adjacent loop coils x1 and x3 of the first group, the absolute value of the sum of output data from the pair of adjacent loop coils x2 and x4 of the second group, the absolute value of the sum of output data from the pair of adjacent loop coils x3 and x5 of the first group, the absolute value of the sum of output data from the pair of adjacent loop coils x4 and x6 of the second group, the absolute value of the sum of output data from the pair of adjacent loop coils x5 and x7 of the first group, . . . .

Assume that the absolute value of the sum of output data from the pair of adjacent loop coils x5 and x7 of the first group is the maximum value, as shown in FIG. 2. In this case, it is determined that the position indication element L of the position indicator 2 is located within the linear region indicated by reference symbol X5X7.

②The "difference" between the outputs from the specified X-axis loop coil pair is obtained.

The signal detection means 15A connects the X-axis scanner 11 to the loop coil pair at the ordinal number specified in advance (the loop coil pair exhibiting the maximum "sum" data), and connects the second switch 165 to the terminal to connect the output terminal of the subtraction amplifier 132 of the X-axis voltage amplifier 13 to the next stage, thereby obtaining the "difference" between the outputs from the specified X-axis loop coils.

For example, referring to FIG. 2, the difference between outputs from the loop coils x5 and x7 appears as an output from the subtraction amplifier 132. This "difference" output represents an X-axis position in the specified linear region X5X7.

The absolute position of the linear region X5X7 in the X direction is known because the positions of the loop coils are determined in advance. With the above operation, therefore, the position determination means 15B in the control means 15 can obtain the absolute position of the position indication element L in the X direction.

Procedure (5): Step of Acquiring Output Signals from X-axis Oscillation System and Step of Specifying Stable X-axis Oscillation System These steps are the same as the above-described steps of acquiring output signals from Y-axis oscillation systems and specifying a stable Y-axis oscillation system except for the axes. These steps are performed to recognize an oscillation system, of the X-axis oscillation systems, which generates the maximum oscillation output so as to determine a Y-axis position.

In this case, X-axis loop coils near the position indicator 2 can be recognized to some extent in the previous step of acquiring "sum" signals from X-axis loop coil pairs and the like. In practice, therefore, the output signal acquisition step is not performed from the beginning unlike the above case, but a predicted X-axis loop coil (e.g., a loop coil near the ordinal number of the X-axis loop coil pair which has generated the maximum "sum" signal in the previous step) is selected, thereby specifying the ordinal number of an X-axis loop coil forming an oscillation system exhibiting the maximum (stable) oscillation output. With this operation, the X-axis loop coil selecting Operation can be minimized, and the position determination speed can be increased.

Procedure (6): Step of Acquiring Induced Signals from Y-axis Position Determination Element Pairs and Y-axis Position Determination Step These steps are also the same as those described above except for the directivity.

By executing bach operation mode described above, the X- and Y-coordinate values of the position indication element L of the position indicator 2 can be determined.

Note that operation information on the ON/OFF operation of the switch 23 of the position indicator 2 is read from the built-in memory 15C to be output to a host apparatus, as needed.

Figure 5:
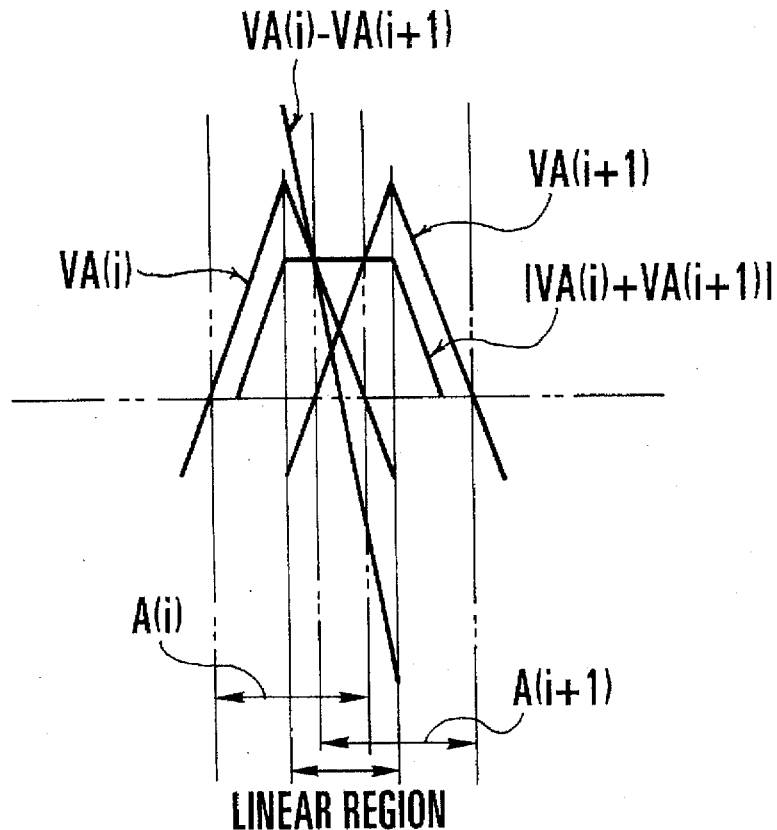
FIG. 5 is a graph showing how the coordinates indicated by a position indicator are detected by an apparatus according to the second embodiment.
Figure 6:
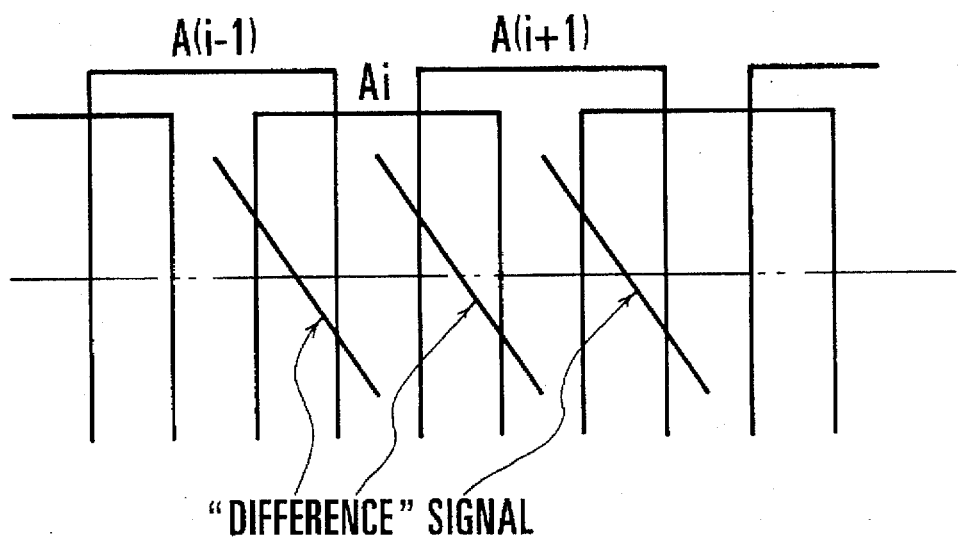
FIG. 6 is a graph showing the arrangement of loop coils of the apparatus of the second embodiment and difference signals based on signals generated in the respective loop coils.

An apparatus according to the second embodiment of the present invention will be described next with reference to FIGS. 5 and 6.

The apparatus of the second embodiment is different from the apparatus of the first embodiment in a manner in which loop coils are arranged on a tablet 1. That is, the loop coils are shifted from each other every 2P/3 (2/P in the apparatus of the first embodiment) where P is the width of each loop coil, as shown in FIG. 6.

Consider adjacent loop coils Ai and A(i+1). In this case, a linear region, a "sum" signal, and a "difference" signal like those shown in FIG. 5 can be obtained. FIG. 5 shows each signal as a model. In practice, since the linearity of each signal deteriorates near an end portion of the linear region, high-precision position determination cannot be performed in this state. However, in this case as well, if such a deterioration in linearity is estimated by experiments, precision correction near an end portion of the linear region can be performed.

As described above, the apparatus of each embodiment described above exemplifies the digitizer of the scheme in which an output signal based on interaction between the position indicator 2 and each loop coil exhibits the maximum output level when the position indicator 2 is present near the center of each loop coil. It is, however, apparent that the present invention can be applied to a digitizer like the one disclosed in Japanese Patent Laid-Open No. 3-241415, i.e., a digitizer in which an output signal exhibits the minimum output level when the position indicator 2 is present near the center, of a loop coil, and the output level gradually increases as the position indicator 2 approaches an end portion of the loop coil. In this case, a signal having the minimum output level may be selected as a "sum" signal.

The apparatuses of the above embodiments are of a cordless type. However, the present invention is not limited to this and can be applied to any type of apparatus as long as a signal is generated in each loop coil on a tablet by the effect of a position indicator 2.

Figure 7:
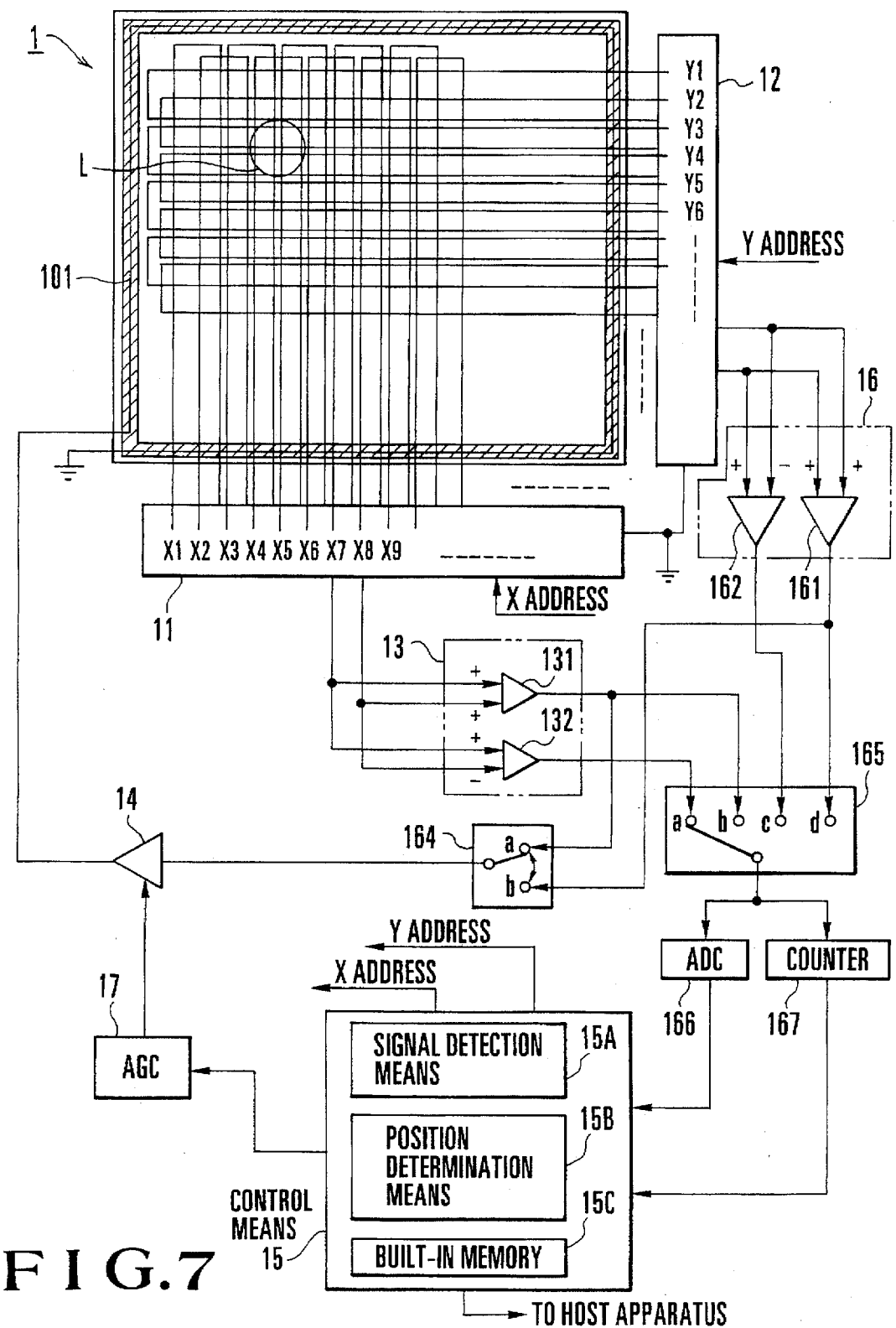
FIG. 7 is a block diagram showing an apparatus according to the third embodiment.

FIG. 7 is a block diagram showing an arrangement of the third embodiment of the present invention. Since the arrangement of a position indicator 2 in each of the subsequent embodiments is the same as that shown in FIG. 1, an illustration of the position indicator 2 is omitted, and only a coil L is shown on a tablet 1 in the block diagrams from FIG. 7.

In the apparatus of the third embodiment shown in FIG. 7, an oscillation system is oscillated by using an output from an addition amplifier 131. Since oscillation and position (positions on only one axis side) detection can be performed on one axis side, the designated coordinate detection step can be simplified. Therefore, position detection can be performed at a higher speed.

An indicated coordinate determining operation of the apparatus of the third embodiment will be described below. An X-coordinate determining operation will be described first.

Procedure (1): Step of Acquiring Output Signals from X-axis Oscillation Systems

Loop coil pairs on one axis side are selected to sequentially form different Oscillation systems. For example, a signal detection means 15A outputs an X address signal to a tablet 1 to select one pair of loop coils. In this manner, loop coil pairs x1x3, x2x4, x3x5, x4x6, . . . are sequentially selected. Every time a loop coil pair is selected, a second switch 165 is controlled to be switched to a terminal b so as to supply an output from an addition amplifier 131, i.e., a "sum" signal from the selected loop coil pair, to the signal detection means 15A. At this time, the "sum " signal is A/D-converted by an ADC 166 and input to the signal detection means 15A. The signal detection means 15A stores/holds the X address signal, which has been output by itself, and the value of the input "sum" signal in correspondence with each other.

Procedure (2): Step of Specifying Stable X-axis Oscillation System

On the basis of the outputs from the respective oscillation systems, which are obtained in the above step, a position determination means 15B specifies a loop coil pair exhibiting the maximum output level (i.e., a loop coil pair on which the position indicator 2 (position indication element L) is located). That is, the position determination means 15B compares the values of the "sum" signals stored/held in the above step, and specifies an X address indicating a loop coil pair exhibiting the maximum output level.

Procedure (3): Step of Determining X-axis Coordinate Value

When the above X address is output to the X-axis scanner 11, the loop coil pair specified as a pair exhibiting the maximum output level in the step of specifying a stable X-axis oscillation system are connected to each other, and an oscillation output from the loop coil pair is measured (output check). If the measured value has reached a predetermined output value, it is determined that the position indicator 2 has not moved, and the next operation is performed. If the measured value has not reached the predetermined value, it is determined that the position indicator 2 has moved, and procedures (1) and (2) described above are repeatedly executed.

When an output from the addition amplifier 131, i.e., a "sum" signal, is obtained, the signal detection means 15A controls/switches the second switch 165 to a terminal a so as to acquire a "difference" signal output from a subtraction amplifier 132. The position determination means 15B calculates an X-axis coordinate value on the basis of this output and the X address.

The X-coordinate determining operation has been described above. A Y-coordinate determining operation is performed in the same manner as the X-coordinate determining operation.

Note that this apparatus can use oscillation systems on the other axis side. More specifically, in the Y-coordinate determining operation, the oscillation system based on the loop coil pair specified in the above X-coordinate determining operation is used as an oscillation system, and a Y-axis scanner 12 sequentially switches/connects loop coil pairs (y1y3, y2y4, y3y5, y4y6, . . . ) to acquire induced voltages from the respective loop coil pairs ("sum" outputs from the addition amplifier 161), thereby determining a Y-coordinate value on the basis of a "difference" signal from a loop coil pair exhibiting the maximum induced voltage.

Figure 8:
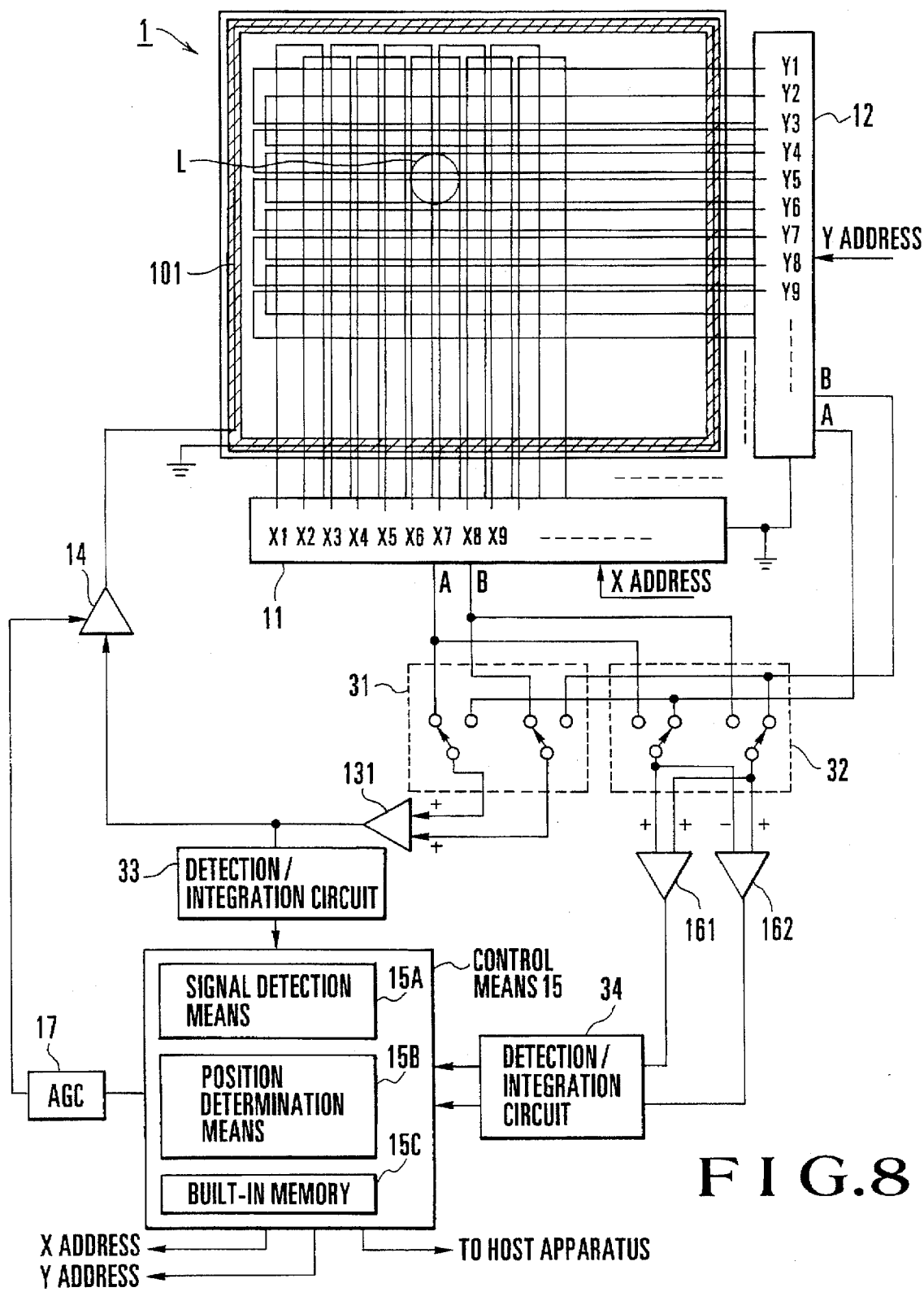
FIG. 8 is a block diagram showing an apparatus according to the fourth embodiment.

FIG. 8 shows an apparatus according to the fourth embodiment of the present invention. In this apparatus of the fourth embodiment, each loop coil pair on one axis side is used for oscillation of an oscillation system, while each loop coil pair on the other axis side is used for position detection.

An operation of the apparatus of the fourth embodiment will be described below. An X-coordinate value detecting operation will be described first.

Procedure (1): Step of Acquiring Output Signals from Y-axis Oscillation Systems and Specifying Stable Oscillation System The loop coil pairs on the Y-axis (oscillation axis) side are skipped every predetermined coil width and sequentially selected. For example, loop coil pairs y1y3, y4y6, y7y9, . . . are selected (coarse search). Of the loop coil pairs selected in this manner, a loop coil pair (e.g., the loop coil pair y4y6) exhibiting the maximum output level is specified. In addition, outputs from the oscillation systems based on loop coil pairs (e.g., the loop coil pairs y3y5 and y5y7) around the specified loop coil pair are checked, thereby specifying a loop coil pair (e.g., the loop coil pair y3y5) which forms an oscillation system exhibiting the maximum output level (near search).

Procedure (2): Step of Forming Y-axis Oscillation System

The loop coil pair (y3y5) specified by the step in procedure (1) are connected to each other to form an oscillation system based on this loop coil pair.

Procedure (3): Step of Specifying X-axis Loop Coil Pair

An X-axis scanner 11 is caused to perform a coarse search (switching/connecting loop coil pairs x1x3, x4x6, x7x9, . . . ) in the same manner as on the Y-axis side, and a switch 32 is switched, thereby acquiring induced voltages from the respective X-axis loop coil pairs ("sum" outputs from an addition amplifier 161). Of these loop coil pairs, a loop coil pair (e.g., the loop coil pair x4x6) exhibiting the maximum induced voltage value is specified, and induced voltages from loop coil pairs (e.g., the loop coil pairs x3x5 and x5x7) around the specified loop coil pair are acquired by a near search. In addition, of these loop coil pairs around the specified loop coil pair, a loop coil pair (e.g., the loop coil pair x5x7) exhibiting the maximum voltage is specified as a loop coil pair on which the position indicator 2 is present.

Procedure (4): X-coordinate Detection Step

The above specified loop coil pair (x5x7) are connected to each other, and the "sum" output is checked to determine whether the output is equal to or higher than a predetermined level. If the output is equal to or higher than the predetermined level, a "difference" output, i.e., an output from a subtraction amplifier 162, is acquired, and an X-coordinate value is calculated on the basis of this output.

The X-coordinate value detecting operation has been described above. Since a Y-coordinate value detecting operation is the same as the above operation except that the steps in procedures (1) to (4) are performed with respect to the Y-axis (the X-axis is an oscillation axis), a description thereof will be omitted.

Referring to FIG. 8, detection/integration circuits 33 and 34 serve to acquire voltage level signals by detecting input waveforms and integrating the detected waveforms. The same function can be realized by software in a control means 15.

Figure 9:
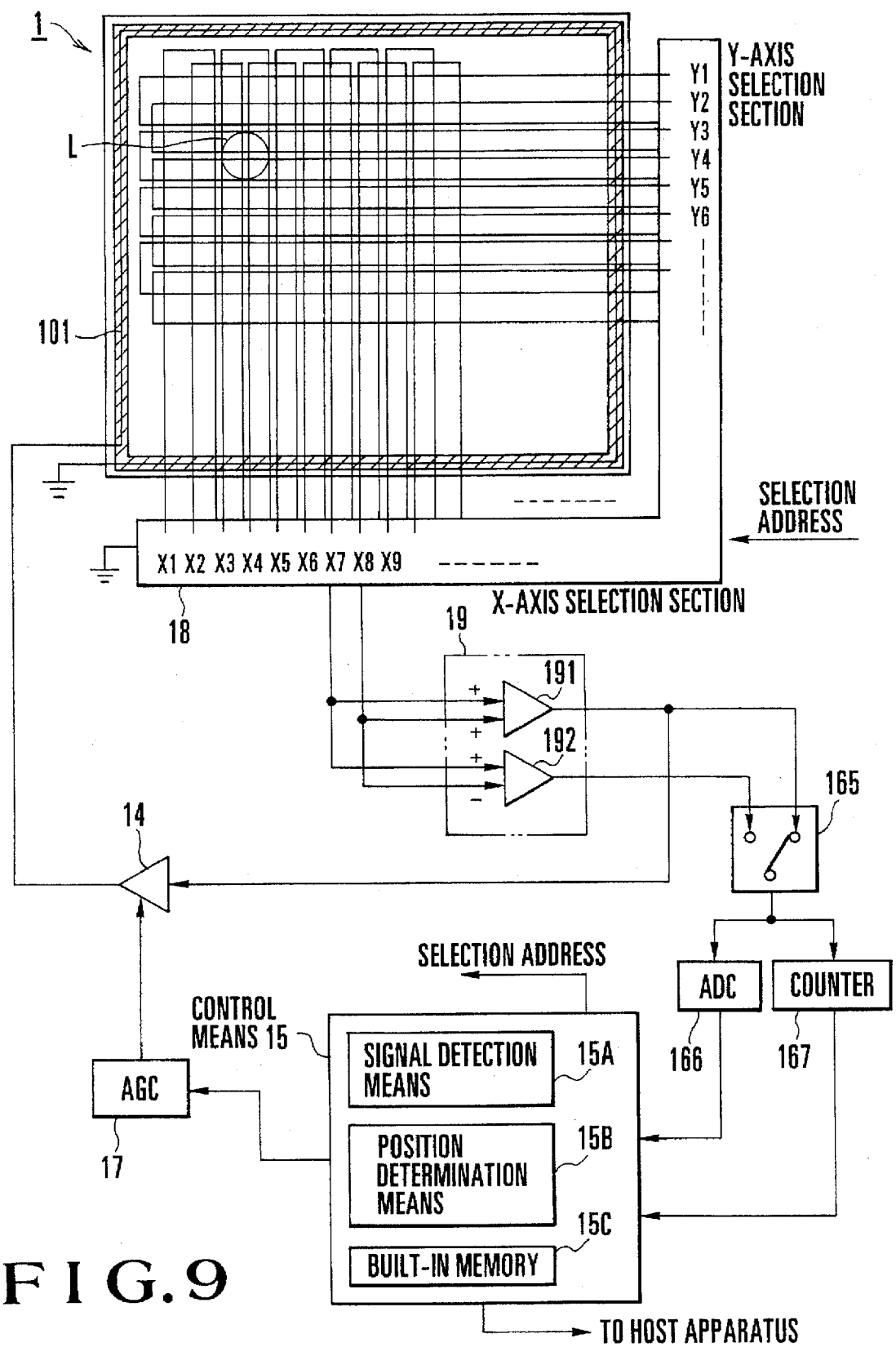
FIG. 9 is a block diagram showing an apparatus according to the fifth embodiment.
Figure 10:
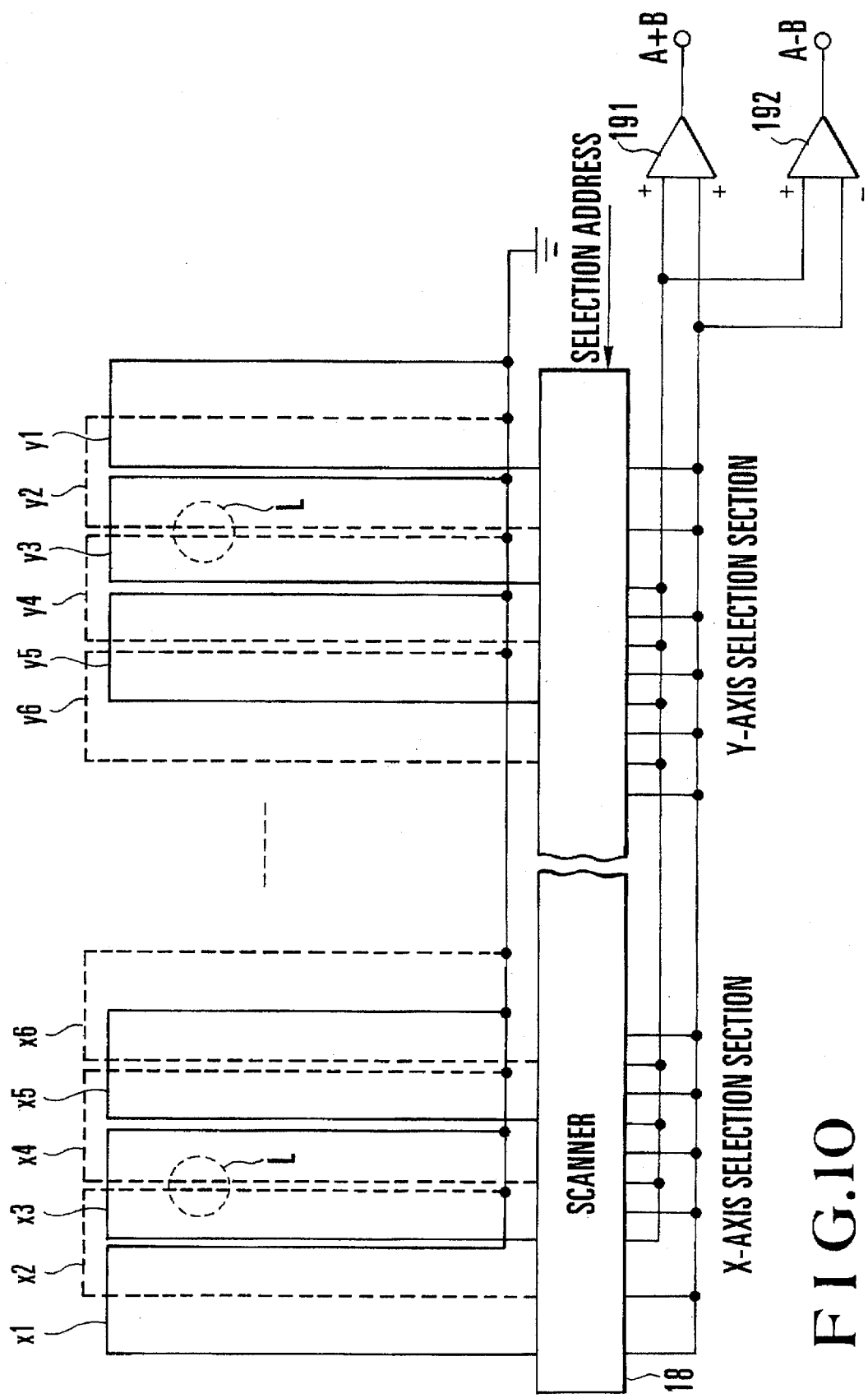
FIG. 10 is a circuit diagram showing the arrangement of the main part of the apparatus of the fifth embodiment.

FIG. 9 shows an apparatus according to the fifth embodiment of the present invention. FIG. 10 shows the main part of the apparatus of the fifth embodiment. In this apparatus of the fifth embodiment, a scanner 18 serves as both X- and Y-axis scanners 11 and 12, and an output from an addition amplifier 191 is used for an oscillation system. In this apparatus, connection of X-axis loop coils and Y-axis loop coils is determined in accordance with the values of selection addresses. With this arrangement, the number of times of scanning of coils, which is M (the number of X-axis loop coils) x N (the number of Y-axis loop coils) in the prior art, can be reduced to M+N to realize a high-speed scanning operation. This arrangement is especially effective for a large-size digitizer having a large number of loop coils.

Figure 11:
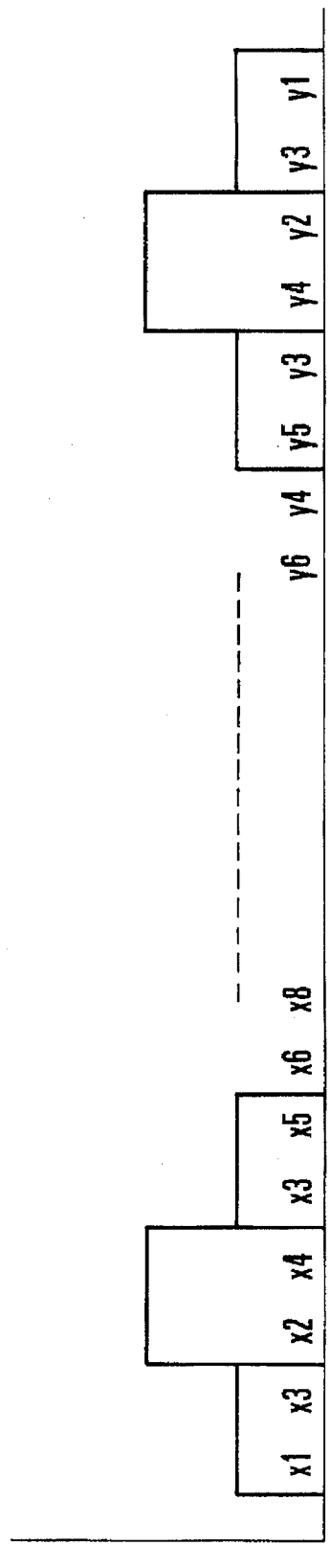
FIG. 11 is a graph showing how a position is detected by the apparatus of the fifth embodiment.

In this apparatus of the fifth embodiment, loop coil pairs (x1x3, x2x4, . . . , y4y2, y3y1, . . . ) are sequentially selected from one end side to the other end side while the X and Y axes are regarded as one axis, and "sum" outputs (outputs from the addition amplifier 191) from the selected loop coil pairs are sequentially acquired. In this case, oscillation output peaks are obtained from the X- and Y-axis loop coil groups, respectively. Two loop coil pairs exhibiting the maximum oscillation output levels, i.e., loop coil pairs (the loop coil pairs x2x4 and y4y2 in FIG. 11) on which a coil L of a position indicator 2 is present on the X- and Y-axes, are specified.

Subsequently, one (x2x4) of the loop coil pairs exhibiting the maximum oscillation output level is selected, and the oscillation output ("sum" output) from the selected coil pair is checked again. If this oscillation output is equal to or larger than a predetermined value, a "difference" output (an output from a subtraction amplifier 192) is kept acquired, and a position (X-coordinate) in the corresponding loop coil pair is calculated.

Subsequently, the other loop coil pair (y4y2) is selected, and a check on an oscillation output and calculation of a position (Y-coordinate) in the loop coil pair are performed in the same manner as described above.

Figure 12:
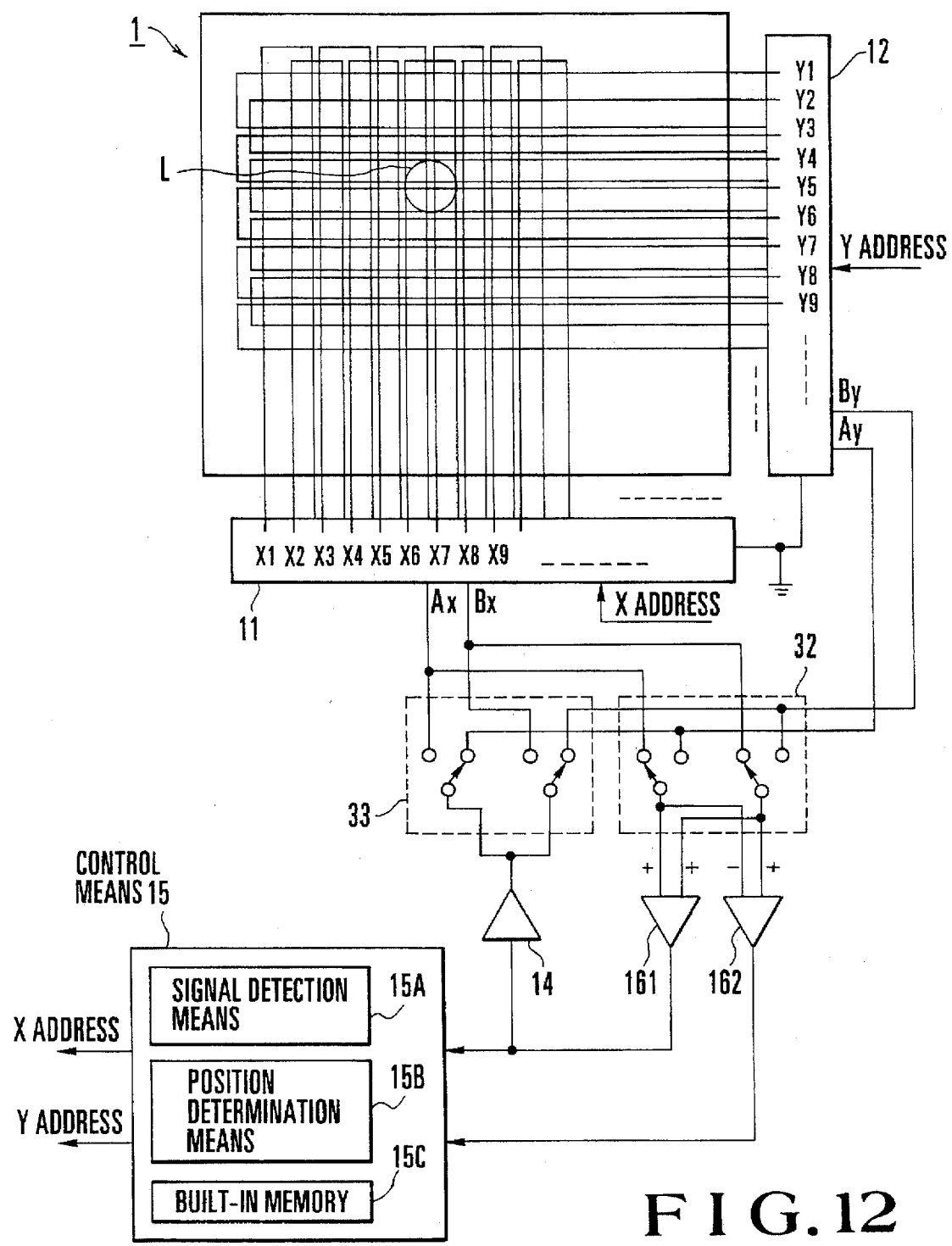
FIG. 12 is a block diagram showing an apparatus according to the sixth embodiment.

FIG. 12 shows an apparatus according to the sixth embodiment of the present invention. The apparatus of the sixth embodiment is of an orthogonal type, in which oscillation systems based on X- and Y-axis loop coil pairs are formed by using an addition amplifier 161.

When an X-coordinate value is to be obtained, the respective terminals of switched 32 and 33 are set in the state shown in FIG. 12, and X- and Y-axis scanners 11 and 12 are operated. The X-axis scanner 11 fixes connection of a loop coil pair x1x3. Meanwhile, the Y-axis scanner 12 sequentially switches connection of loop coil pairs y1y3, y2y4, y3y5, . . . . When connection of loop coil pairs is performed by the Y-axis scanner 12 by one cycle, the X-axis scanner 11 fixes connection of a next loop coil pair x2x4. Thereafter, the Y-axis scanner 12 performs the same operation as described above.

When intersection between X- and Y-axis loop coil pairs has reached the position of a coil L of a position indicator 2 after such an operation is repeatedly performed, an oscillation system is constituted by the Y-axis loop coil pair, the coil L of the position indicator 2, the X-axis loop coil pair, the addition amplifier 161, a current amplifier 14, and the Y-axis loop coil. An oscillation system having the maximum oscillation output, i.e., X- and Y-axis loop coil pairs corresponding to the maximum output from the addition amplifier 161, is specified, and connection of these loop coil pairs is fixed. In addition, a "difference" output from the oscillation system having the maximum output (i.e., an output from a subtraction amplifier 162), is acquired, and a position (X-coordinate) in the corresponding loop coil pairs is calculated.

When a Y-coordinate value is to be obtained, the respective terminals of the switches 32 and 33 are switched to a state opposite to the state shown in FIG. 12, and a connection switching operation is performed in the same manner as in the X-coordinate detecting operation. When the intersection between two selected loop coil pairs has reached the position of the coil L of the position indicator 2, an oscillation system is constituted by the X-axis loop coil pair, the coil L of the position indicator 2, the Y-axis loop coil pair, the addition amplifier 161, the current amplifier 14, and the X-axis loop coil pair. In this case as well, an oscillation system having the maximum oscillation output is selected, and a "difference" output from the oscillation system having the maximum output is acquired, thereby obtaining a position (Y-coordinate) in the corresponding coil pairs, in the same manner as described above.

As described above, according to the present invention, the position coordinates indicated by the position indicator 2 are obtained by using the "sum" of and the "difference" between signals generated in two adjacent loop coils on the tablet 1.

The detailed relationship between the position of each loop coil and the diameter of the coil L of the position indicator 2 will be described in detail next.

In the apparatus of the first embodiment shown in FIG. 1, as also shown in FIG. 2, for example, the right long-side conductors of the loop coils x1, x3, x5, . . . indicated by the, solid lines and the left long-side conductors of the loop coils x3, x5, and x7 are electrically insulated from each other and arranged to be adjacent to each other. Similarly, the right long-side conductors of the loop coils x2, x4, x6, . . . indicated by the broken lines and the left long-side conductors of the loop coils x4, x6, and x8, . . . are electrically insulated from each other and arranged to be adjacent to each other. These solid line loop coils and broken line loop coils are shifted from each other by half a pitch (i.e., ½ the length of the short-side conductor of each loop coil).

Assume that in FIG. 2, the coil L of the position indicator 2 crosses, for example, the arrangement region of the adjacent loop coils x5 and x7 in a direction perpendicular to a long-side conductor of each loop coil (i.e., in the direction of a short-side conductor). In this case, as shown in FIGS. 3 and 4, "sum" and "difference" signals are obtained from the simultaneously selected loop coils x5 and x7.

If the arrangement pitch of the above solid and broken line loop coils (i.e., ½ a short-side conductor length W of each loop coil) is set to be equal to a diameter D of the coil L of the position indicator 2, "sum" and "difference" signals can be accurately obtained from a loop coil pair, and the respective loop coil pairs can be arranged on the tablet 1 without wasting any space.

Figure 13A:
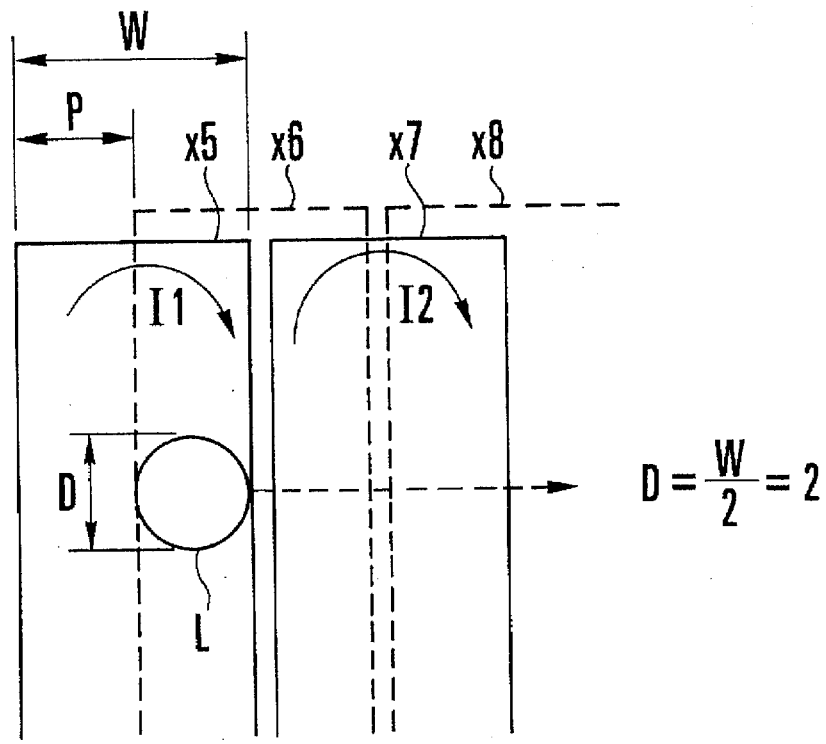
FIGS. 13A and 13B are views showing a relationship between the diameter of the coil of the position indicator and the arranged state of each loop coil.
Figure 13B:
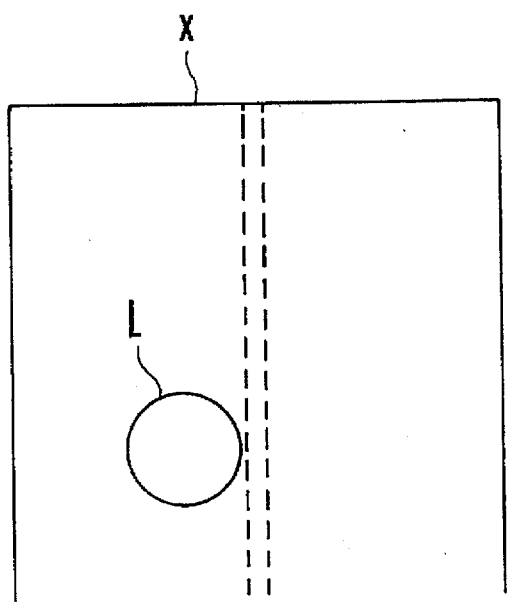

Assume that the simultaneously selected loop coils x5 and x7 have the same shape and the same output signal characteristics. In this case, shown in FIG. 13A, when currents I1 and I2 respectively flow in the loop coils x5 and x7, the currents flowing in the right long-side conductor of the loop coil x5 and the adjacent left long-side conductor of the loop coil x7 cancel each other. The overall loop coil pair x5x7 becomes equivalent to one loop coil x like the one shown in FIG. 13B. As a result, a "sum" signal obtained from the respective coils of the loop coil pair x5x7 exhibits constant, flat characteristics (constant value) with respect to each of the adjacent long-side conductor portions (corresponding to an origin O in FIG. 3) regarded as a center, and a "difference" signal can be represented by a linear function indicated by a straight line centered on the origin O.

As described above, loop coil pairs having the same shape and the same output signal characteristics are sequentially arranged in the direction of short-side conductors in accordance with the diameter of the coil L of the position indicator 2 in such a manner that each pair of adjacent long-side conductor portions are located at almost the same position. With this arrangement, "sum" and "difference" signals can be accurately obtained from signals from a selected loop coil pair, and the respective loop coils can be arranged on the tablet 1 without wasting any space.

Figure 14A:
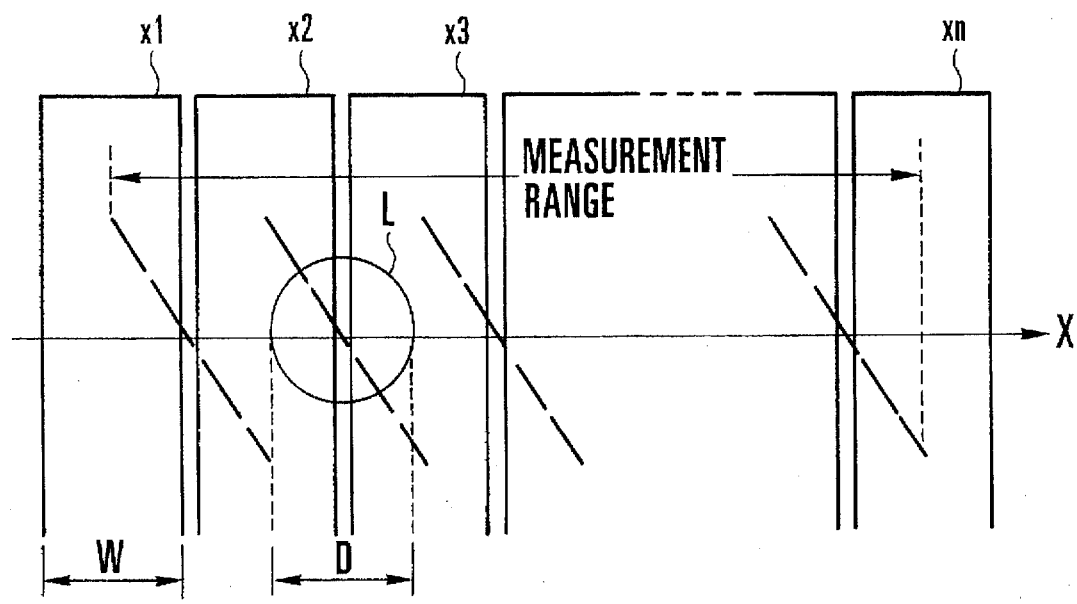
FIGS. 14A and 14B are views showing another relationship between the diameter of the coil of the position indicator and the arranged state of each loop coil.

FIG. 14A shows a case wherein the diameter D of the position indicator 2 is set to be almost equal to the short-side conductor length W of each of the loop coils x1, x2, x3, . . . . Although FIG. 14A shows the relationship between the diameter D and the length W of each loop coil in the X-axis direction, this also applies to each loop coil in the Y-axis direction.

If the diameter D of the coil L of the position indicator 2 is set in this manner, the respective loop coils can be arranged, as one group, on the same plane of the tablet such that they are adjacent to each other. Therefore, in selecting/scanning each loop coil, the adjacent loop coil pairs x1x2, x2x3, x3x4, . . . are sequentially selected, instead of selecting every other loop coil pair as in the apparatus of the first embodiment.

Figure 14B:
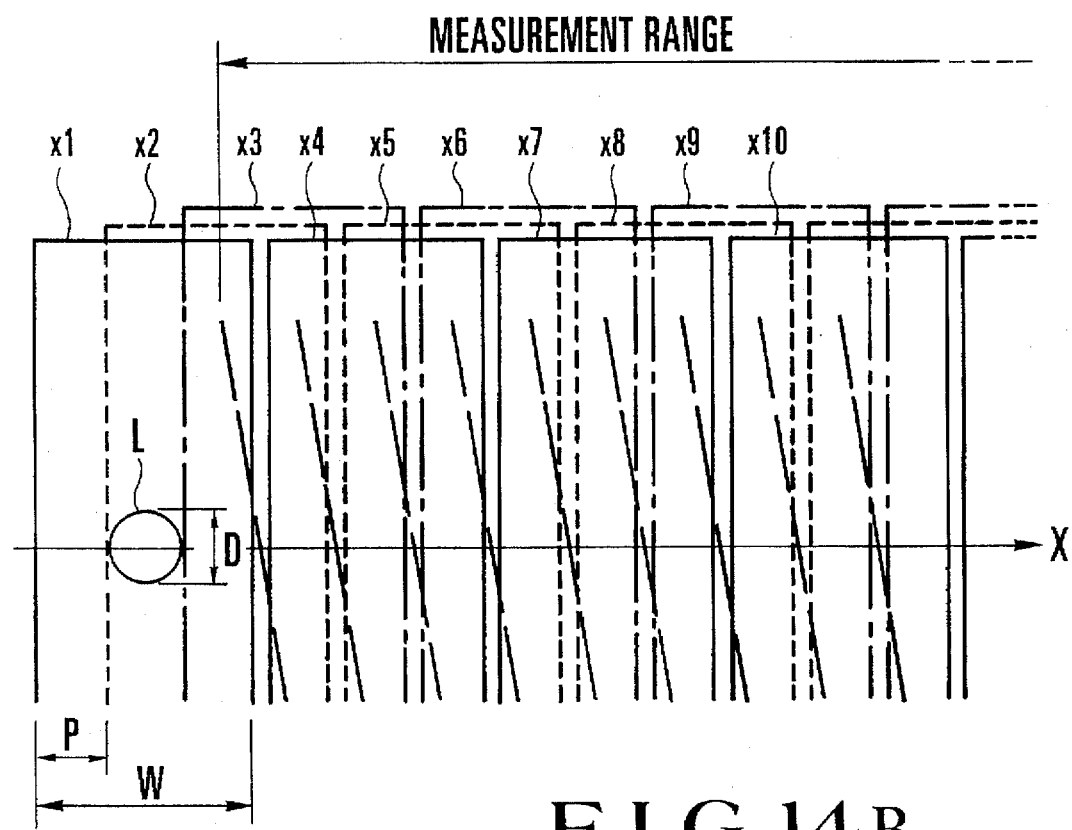
Figure 15:
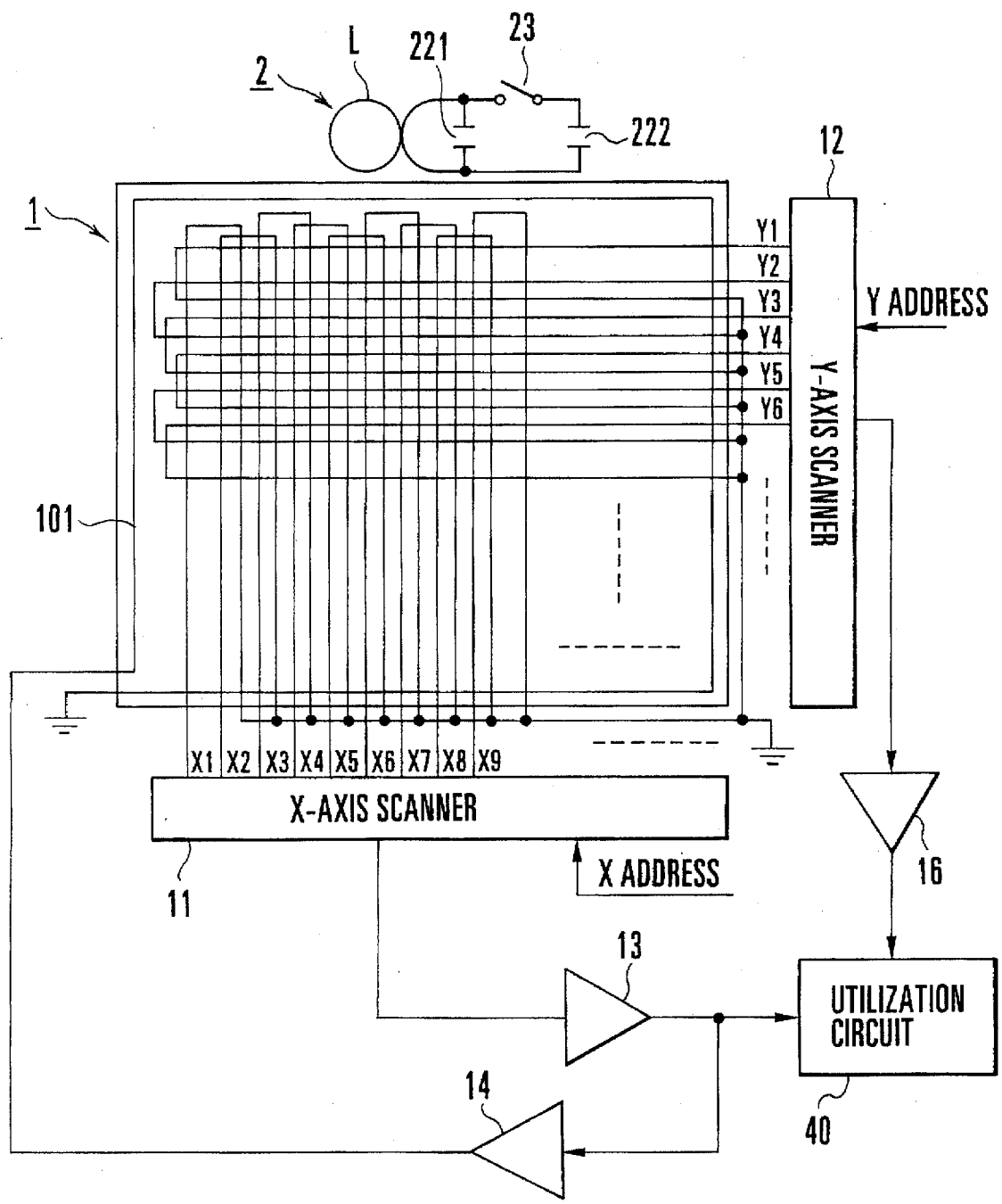
FIG. 15 is a block diagram showing a conventional apparatus.
Figure 16A:
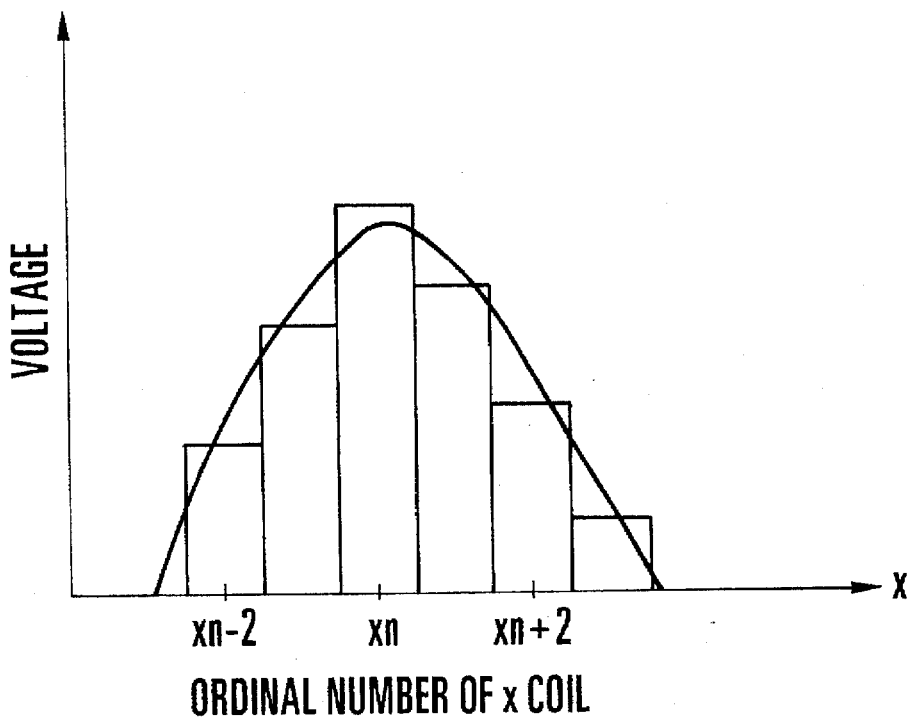
FIGS. 16A and 16B are graphs showing how a position is detected by the conventional apparatus.
Figure 16B:
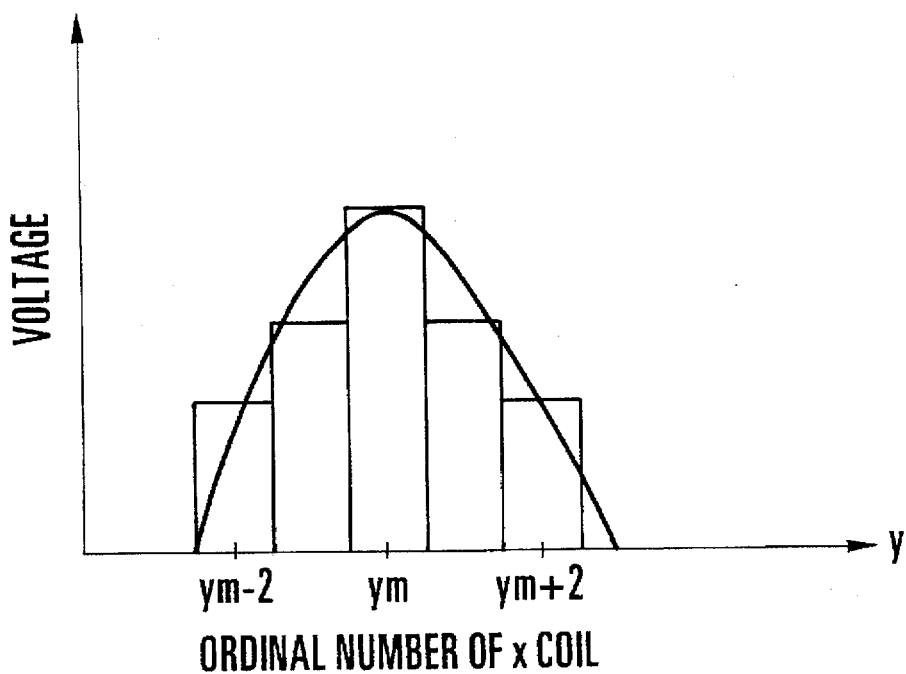

FIG. 14B shows a case wherein the diameter D of the coil L of the position indicator 2 is set to be ⅓ the short-side conductor length W of each loop coil.

In this arrangement, for example, the loop coils x1, x4, x7, x10, . . . . are arranged as a first group (a loop coil group indicated by the solid lines in FIG. 14B); the loop coils x2, x5, x8, x11, . . . , as a second group (a loop coil group indicated by the dotted lines in FIG. 14B); and the loop coils x3, x6, x9, x12, . . . , as a third group (a loop coil group indicated by the chain lines in FIG. 14B). In addition, an arrangement pitch P of each group is set to be ⅓ the short-side conductor length W of each loop coil.

In selecting/scanning each loop coil pair, the loop coils x1 and x4 of the first group are simultaneously selected first. Subsequently, the loop coils x2 and x5 of the second group, and the loop coils x3 and x6 of the third group are simultaneously selected, respectively. Thereafter, the loop coils x4 and x7 of the first group are selected. In this manner, a pair of every two other loop coils are simultaneously selected.

Although FIG. 14B shows an arrangement of the loop coils in the X-axis direction, this also applies to the loop coils in the Y-axis direction. As shown in FIG. 14B, every two other loop coils shifted by P/3 are paired and selected. Therefore, as compared with the arrangement of the loop coils in FIG. 14A, degradation of precision of the end portions of the linear regions contacting each other can be prevented.

As has been described above, according to the present invention, the position coordinates indicated by the position indicator are obtained by using the "sum" of and the "difference" between signals generated in two loop coils on the tablet. Even if, therefore, output signals greatly deviate from a quadratic function, a predetermined position detection precision can be ensured.

When a "sum" signal from a selected loop coil pair of one axis side exhibits the maximum or minimum value, the loop coil pair is fixed as an oscillation system. When a "sum" signal from a selected loop coil pair of the other axis side exhibits the maximum or minimum value, a "difference" signal is obtained. With this operation, when the position indicated by the position indicator is to be detected without using any oscillator, the indicated position coordinates can be accurately obtained.

In addition, when a loop coil pair is selected as an oscillation system, and an output from an addition amplifier exhibits the maximum value, a "difference" signal output from a subtraction amplifier is acquired. Therefore, the processing time in position detection can be greatly shortened.

Furthermore, since loop coil pairs are selectively extracted from each loop coil group, the time required for scanning loop coils in position detection can be shortened.

Moreover, since one scanner serves both as X- and Y-axis scanners, no switch for X and Y axes is required, resulting in an economical apparatus.

An oscillation system is formed by X- and Y-axis loop coil pairs. For this reason, X- and Y-coordinate positions can be simultaneously detected using the formed oscillation system.

The respective loop coils are sequentially arranged in accordance with the coil diameter of the position indicator. Therefore, the loop coils can be properly arranged on the tablets

What is claimed is:

1. A digitizer comprising:
   a position indicator having a coil;
   a tablet having a loop coil group;
   interaction means for causing the coil of said position indicator to interact with the loop coil group of said tablet;
   signal detection means for sequentially selecting two loop coils as a loop coil pair from the loop coil group of said tablet and acquiring a sum of and a difference between signals generated in respective coils of a plurality of loop pairs of said loop coil group;
   sum signal specifying means for specifying one of said loop coil pairs of said loop coil group which generates a sum signal of a maximum absolute value when the coil of said position indicator and the loop coil group of said tablet are brought into an interaction state; and
   coordinate determination means for determining position coordinates on said tablet designated by said position indicator, on the basis of a difference signal of said specified loop coil pair.

2. A digitizer according to claim 1, wherein said loop coil group is conditioned as follows:
   a. in each loop coil constituting said loop coil group, when the coil of said position indicator is at the center of each coil, the level of an output signal due to the interaction of each coil with the coil of said position indicator is one of maximized and minimized and as the coil of said position indicator moves from the center of each coil to approach respective opposite ends of each coil, the level of the output signal gradually one of decreases and increases to form level varying regions on both sides of said center, each of said level varying regions has at least a linear change region in which the level is designed to change linearly, and the level changes in both of the linear change regions are symmetrical to each other to provide a positive linear change region on one side of said center and a negative linear change region on the other side;
   b. in said loop coil group, loop coil pairs each having two of said loop coils which are arranged sequentially in a direction of position detection; and
   c. in said loop coil pair, the positive linear change region of one loop coil overlaps the negative linear change region of the other loop coil.

3. A digitizer according to claim 2, wherein said interaction means is an oscillation system which connects a peripheral coil disposed around said tablet and a selected loop coil of said loop group through an amplifier and which cooperates with the coil of said position indicator, and said loop coil group is arranged on said tablet such that said loop coil group is divided into a loop coil group on one axis and a loop coil group on the other axis perpendicular to one axis, and said signal detection means fixes a selected loop coil on one axis as the oscillation system for causing the interaction when an absolute value of a signal from said selected loop coil is a maximum value, and acquires the difference signal when an absolute value of a sum signal from a selected loop coil pair on the other axis is a maximum value.

4. A digitizer according to claim 2, wherein said signal detection means has an addition amplifier for adding signals generated in the selected loop coil pair of said loop coil group and a subtraction amplifier for subtracting signals generated therein, said interaction means is an oscillation system which connects said selected loop coil pair and a peripheral coil disposed around said tablet through said addition amplifier of said signal detection means and which cooperates with the coil of said position indicator, said loop coil group is arranged on said tablet such that said loop coil group is divided into a loop coil group on one axis and a loop coil group on the other axis perpendicular to one axis, and said signal detection means acquires a difference signal output from said subtraction amplifier when a loop coil pair is selected as the oscillation system for causing the interaction, and an output from said addition amplifier exhibits a maximum value.

5. A digitizer according to claim 2, wherein said signal detection means selectively extracts loop coil pairs from said loop coil group on one axis and said loop coil group on the other axis.

6. A digitizer according to claim 2, wherein one of said signal detection means serves both as first selection means for selecting a loop coil pair from said loop coil group on one axis, and second selection means for selecting a loop coil pair from said loop coil group on the other axis.

7. A digitizer according to claim 2, wherein said loop coil group is arranged on said tablet such that said loop coil group is divided into a loop coil group on one axis and a loop coil group on the other axis perpendicular to one axis, and an oscillation system for causing the interaction is formed by using a loop coil pair selected from said loop coil group on one axis and a loop coil pair selected from said loop coil group on the other axis.

8. A digitizer according to claim 2, wherein said loop coils of said loop coil group are sequentially arranged in accordance with a coil diameter of said position indicator.

9. A position determination method for a digitizer including a tablet on which a plurality of loop coils are arranged in association with positions, and a position indicator having at least a coil which electromagnetically interacts with each loop coil, comprising the steps of:

sequentially selecting two loop coils as a loop coil pair from a loop coil group;

calculating a sum signal of signals of each selected loop coil pair generated by interaction between each selected loop coil pair and said positions indicator;

specifying a loop coil pair which generates a sum signal indicative of the maximum in absolute value among the sum signals calculated with the respective loop coil pairs; and calculating a difference signal of said specified loop coil pair generating the maximum sum signal and determining a position on said tablet designated by said position indicator, on the basis of the difference signal.

* * * * *

UNITED STATES PATENT AND TRADEMARK OFFICE
CERTIFICATE OF CORRECTION

PATENT NO. : 5,670,754
DATED : September 23, 1997
INVENTOR(S) : Matsushima

It is certified that error appears in the above-identified patent and that said Letters Patent is hereby corrected as shown below:

In column 2, at line 29, and column 4, at line 10 please delete "Coils" and insert --coils--.

In column 4, at line 28, please delete "t9" and insert --to--.

In column 5, at line 57, please delete "x5 and x" and insert --x5 and x7--.

In column 7, at line 44, please delete "specifying" and insert --Specifying--.

In column 9 at line 33, please delete "Operation" and insert --operation--.

In column 9 at line 40, please delete "bach" and insert --each--.

In column 10 at line 39, please delete "manner,," and insert --manner,--.

In column 13 at line 53, please delete "indicated by the," and insert --indicated by the--

Signed and Sealed this

First Day of June, 1999

Attest:

Q. TODD DICKINSON

Attesting Officer

Acting Commissioner of Patents and Trademarks